US009699741B1

(12) United States Patent
Chu et al.

(10) Patent No.: US 9,699,741 B1
(45) Date of Patent: Jul. 4, 2017

(54) METHOD AND APPARATUS FOR DETERMINING ACCESS CONTROL PARAMETERS FOR DEVICES IN A WIRELESS COMMUNICATIONS NETWORK

(71) Applicant: Marvell International Ltd., Hamilton (BM)

(72) Inventors: Liwen Chu, San Ramon, CA (US); Lei Wang, San Diego, CA (US); Hui-Ling Lou, Sunnyvale, CA (US); Hongyuan Zhang, Fremont, CA (US); Yakun Sun, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 146 days.

(21) Appl. No.: 14/687,442

(22) Filed: Apr. 15, 2015

Related U.S. Application Data

(60) Provisional application No. 61/986,598, filed on Apr. 30, 2014, provisional application No. 62/141,152, filed on Mar. 31, 2015.

(51) Int. Cl.
*H04W 52/24* (2009.01)
*H04W 74/00* (2009.01)
*H04W 84/12* (2009.01)
*H04W 88/08* (2009.01)

(52) U.S. Cl.
CPC ....... *H04W 52/243* (2013.01); *H04W 74/002* (2013.01); *H04W 84/12* (2013.01); *H04W 88/08* (2013.01)

(58) Field of Classification Search
None
See application file for complete search history.

(56) References Cited

U.S. PATENT DOCUMENTS

| 6,351,651 | B1 | 2/2002 | Hamabe et al. |
| 8,913,582 | B1 | 12/2014 | Zhang et al. |
| 9,402,238 | B1 | 7/2016 | Sun et al. |
| 2008/0119216 | A1 | 5/2008 | Lee et al. |
| 2009/0143016 | A1 | 6/2009 | Li |
| 2010/0087221 | A1 | 4/2010 | Srinivasan et al. |
| 2012/0163305 | A1 | 6/2012 | Nimbalker et al. |

(Continued)

*Primary Examiner* — Huy D Vu
*Assistant Examiner* — Hong Shao

(57) ABSTRACT

A wireless communication system includes a first access point, and at least one first station in communication with the first access point. The first access point controls access parameters for communications with a first station. The access parameters may include Enhanced Distributed Channel Access parameters such as a minimum or maximum contention window parameter, an arbitration interframe spacing parameter, or a transmit opportunity limit parameter. The access parameters also may include a channel bandwidth parameter, a transmit power parameter, or a data rate parameter such as a modulation and coding scheme parameter. Where the system includes an additional access point, and at least one additional station in communication with the additional access point, the first access point and the additional access point control access parameters to avoid interference between the first access point and the additional access point. A central controller may coordinate between the first and additional access points.

24 Claims, 3 Drawing Sheets

(56) References Cited

U.S. PATENT DOCUMENTS

| | | |
|---|---|---|
| 2012/0178482 A1 | 7/2012 | Seo et al. |
| 2013/0017859 A1 | 1/2013 | Yamamoto et al. |
| 2013/0143614 A1 | 6/2013 | Lee et al. |
| 2013/0265992 A1 | 10/2013 | Deng et al. |
| 2013/0329592 A1 | 12/2013 | Beale |
| 2014/0141832 A1 | 5/2014 | Liang et al. |
| 2015/0017993 A1 | 1/2015 | Ishii |
| 2015/0237655 A1 | 8/2015 | Lu et al. |
| 2015/0359008 A1* | 12/2015 | Wang ................ H04W 74/004 370/330 |
| 2015/0382333 A1* | 12/2015 | Seok ................ H04W 74/0808 370/338 |

\* cited by examiner

METHOD AND APPARATUS FOR DETERMINING ACCESS CONTROL PARAMETERS FOR DEVICES IN A WIRELESS COMMUNICATIONS NETWORK

CROSS REFERENCE TO RELATED APPLICATIONS

This claims the benefit of commonly-assigned U.S. Provisional Patent Application No. 61/986,598, filed Apr. 30, 2014, and commonly-assigned U.S. Provisional Patent Application No. 62/141,152, filed Mar. 31, 2015, each of which is hereby incorporated by reference herein in its respective entirety.

FIELD OF USE

This disclosure relates to controlling access point power levels in a wireless communications network.

BACKGROUND

A wireless communications network may include a plurality of access points (APs), with each respective access point serving a respective plurality of stations (STAs). For example, in a wireless local area network (WLAN) under the IEEE802.11 standard (commonly referred to as "Wireless Fidelity" or "WiFi"), a grouping including one access point and its associated stations may be referred to as a "basic service set" (BSS). Such a network may include multiple BSSs.

Where multiple stations attempt to communicate with a single access point within a BSS, Enhanced Distributed Channel Access (EDCA), first introduced under the IEEE802.11e standard, may be used to determine which stations have priority over other stations for use of the finite bandwidth available to the access point, based on the type of communication ("access category" or "AC") involved. However, depending on the number of stations in the BSS, the EDCA parameters may be insufficient to prevent collisions between stations, resulting in performance degradation. Some degradation situations may involve in a network with multiple access points, some of which may have overlapping coverage areas ("overlapping BSSs" or "OBSSs").

SUMMARY

A wireless communication system includes a first wireless access point, and a first set of at least one first station in wireless communication with the first wireless access point. The first wireless access point controls access parameters for communications with a first station in the set of at least one first station.

In such a wireless communication system, the access parameters may include Enhanced Distributed Channel Access parameters. The Enhanced Distributed Channel Access parameters may include one or more of a minimum contention window parameter, a maximum contention window parameter, an arbitration interframe spacing parameter, or a transmit opportunity limit parameter. Where the Enhanced Distributed Channel Access parameters includes a transmit opportunity limit parameter, the transmit opportunity limit parameter is selected based on at least one of interference level, clear channel access level, or data rate.

In such a wireless communication system, the access parameters also may include one or more of a channel bandwidth parameter, a transmit power parameter, or a data rate parameter. The data rate parameter may include a modulation and coding scheme parameter.

The wireless communication system may further include an additional wireless access point, and an additional set of at least one additional station in wireless communication with the additional wireless access point. The additional wireless access point controls access parameters for communications with an additional station in the additional set of at least one additional station, and the first wireless access point and the additional wireless access point control access parameters to avoid interference between the first wireless access point and the additional wireless access point.

A wireless communication system further including an additional wireless access point, and an additional set of at least one additional station in wireless communication with the additional wireless access point may include a central controller that coordinates between the first wireless access point and the additional wireless access point so that the first wireless access point and the additional wireless access point set access parameters to avoid interference between the first wireless access point and the additional wireless access point.

A method of operating a wireless communication system having a first wireless access point, and a first set of at least one first station in wireless communication with the first wireless access point, includes controlling access parameters at the first wireless access point for communications with a first station in the set of at least one first station.

Such a method may further include controlling access parameters at an additional wireless access point for communications with an additional station in an additional set of at least one additional station, where the controlling access parameters at the first wireless access point and the controlling access parameters at the additional wireless access point are performed to avoid interference between the first wireless access point and the additional wireless access point.

In such a method, controlling access parameters at the first wireless access point may include setting a channel access parameter for distant stations to a first channel when the additional wireless access point sets the channel access parameter for distant stations to a second channel, and setting the channel access parameter for distant stations to the second channel when the additional wireless access point sets the channel access parameter for distant stations to the first channel.

In such a method, controlling access parameters at the first wireless access point may include setting a first transmit power threshold for stations with a first transmit opportunity bandwidth access parameter when the additional wireless access point sets a second transmit power threshold for stations with a second transmit opportunity bandwidth access parameter, and setting the second transmit power threshold for stations with the first transmit opportunity bandwidth access parameter when the additional wireless access point sets the first transmit power threshold for stations with the second transmit opportunity bandwidth access parameter.

Such a method may include coordinating between the first wireless access point and the additional wireless access point so that the first wireless access point and the additional wireless access point set power levels to avoid interference between the first wireless access point and the additional wireless access point.

BRIEF DESCRIPTION OF THE DRAWINGS

Further features of the disclosure, its nature and various advantages, will be apparent upon consideration of the FIG. 1 illustrates an example of an arrangement of BSSs with which this disclosure can be used.

DETAILED DESCRIPTION

Figure 1:
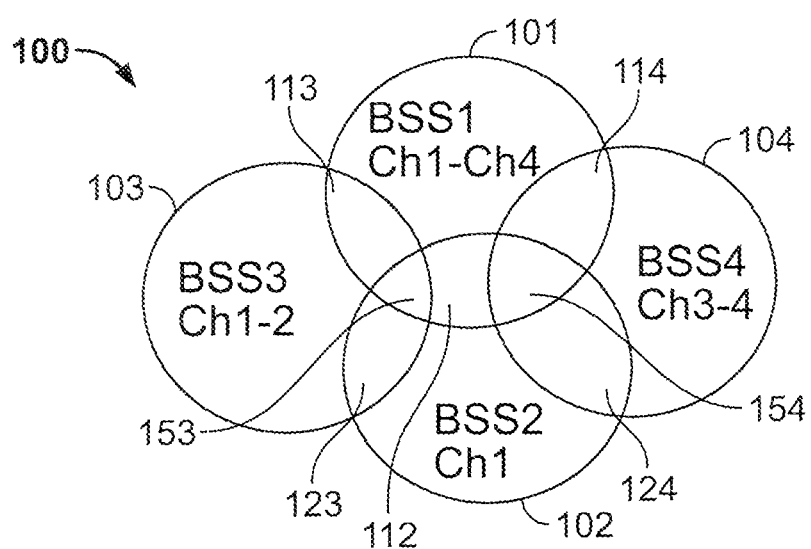

Various implementations of this disclosure provide more selective access control between an access point and its associated stations to mitigate the performance degradation described above. Access control also may be coordinated between multiple access points, and particularly between access points located near each other in OBSS configurations.

Under ordinary EDCA, all stations in a BSS use the same EDCA parameters. For example, all stations in a BSS use the same operation channel bandwidth and have the same maximum transmit power. According to this disclosure, modified access control is provided, in which different stations may use different EDCA parameters.

Standard EDCA parameters for the four access categories (ACs) of "background" (AC_BK), "best effort" (AC_BE) "video" (AC_VI) and "voice" (AC_VO) are shown in Table 1, where CWmin and CWmax are the minimum and maximum contention windows, AIFSN represents the arbitration interframe spacing, and TXOP refers to transmit opportunity:

TABLE 1

| AC | CWmin | CWmax | AIFSN | TXOP Limit For PHYs defined in Clause 16 and Clause 17 | For PHYs defined in Clause 18, Clause 19, and Clause 20 | Other PHYs |
|---|---|---|---|---|---|---|
| AC_BK | aCWmin | aCWmax | 7 | 0 | 0 | 0 |
| AC_BE | aCWmin | aCWmax | 3 | 0 | 0 | 0 |
| AC_VI | (aCWmin + 1)/2 − 1 | aCWmin | 2 | 6.016 ms | 3.008 ms | 0 |
| AC_VO | (aCWmin + 1)/4 − 1 | (aCWmin + 1)/2 − 1 | 2 | 3.264 ms | 1.504 ms | 0 |

If all stations in a BSS use the same EDCA parameters, a slower station (e.g., one using a slower Modulation and Coding Scheme (MCS)) will be granted access on the same basis as a faster station, even though, for the same amount of data, the slower station will consume more medium time. Although a non-zero transmit opportunity (TXOP) limit might partially resolve such apparent unfairness, the default TXOP limits for some access categories are already 0.

In accordance with implementations of this disclosure, the standard EDCA parameter set is replaced by a differentiated EDCA parameter set having one set of high-priority parameters and one set of low-priority parameters. Additional parameter sets (e.g., an intermediate parameter set) may be included as well.

According to one implementation, when a station is far from the access point, meaning that transmissions between that station and the access point would likely be slower, that station would use low-priority EDCA parameters to mitigate the aforementioned apparent unfairness. Within a given access category, the low-priority parameters may include a smaller TXOP limit, and longer CWmin, CWmax and AIFSN.

In such an implementation based on distance, the access point can transmit EDCA parameters to all stations in the BSS associated with that access point. A new management frame or beacon frame can be provided for this transmission. If the access point transmits the higher-priority EDCA parameter set using lower transmit power, wider transmission bandwidth, and/or higher MCS or data rate, while transmitting the lower-priority EDCA parameter set using higher transmit power, narrower transmission bandwidth, and/or lower MCS or data rate, then stations that are closer to the access point will receive both EDCA parameter sets while stations that are farther from the access point will receive only the lower-priority EDCA parameter set. Each station can be configured to use the higher-priority EDCA parameter set if the station receives both parameter sets, and otherwise to use the only EDCA parameter set that the station receives (i.e., the lower-priority parameter set). In this way, each station will automatically receive and use the EDCA parameter set that that station should be using.

According to another implementation, stations with lower data rates (i.e., lower MCSs) would have lower priority. In one variant of this implementation, there could be multiple levels of priority. In this implementation, the access point would transmit different EDCA parameter sets along with an MCS threshold appurtenant to each EDCA parameter set. If there are only two EDCA parameter sets (i.e., higher-priority and lower-priority), there would be only one threshold and each station could be configured to use the higher-priority EDCA parameter set only if that station's maximum MCS data rate equals or exceeds the threshold. If there are more than two EDCA parameter sets, there would be at least two thresholds, and each station could be configured to use the EDCA parameter set associated with the highest threshold that that station's maximum MCS data rate equals or exceeds. In a further variant of this implementation, the stations could be configured to use highest priority EDCA parameter set regardless of the relationship of its maximum MCS data rate to any threshold, except for access categories for which the TROP limit is '0', in which case the EDCA parameter set would be selected based on the highest threshold that that station's maximum MCS data rate equals or exceeds.

Other implementations may address the issue of overlapping BSSs, where one station may see more than one access point. In such a situation, different stations associated with a particular access point may see different adjacent BSSs depending on the transmit power parameters of the different access points.

For example, in the configuration 100 of FIG. 1, BSS1 (101) uses channels 1 and 4, BSS2 (102) uses channel 1 only, BSS3 (103) uses channels 1 and 2, and BSS4 (104) uses channels 3 and 4. Thus, a station in overlap area 114 that uses channel 4 might see, depending on power levels, the access points for both BSS1 (101) and BSS4 (104). A station in overlap area 154 that uses channel 1 might see the access points for both BSS1 (101) and BSS2 (102), while a station in overlap area 154 that uses channel 4 might see the access points for both BSS1 (101) and BSS4 (104). Similarly, a station in overlap area 112 that uses channel 1 might see the access points for both BSS1 (101) and BSS2 (102). A station in overlap area 113 that uses channel 1 might see the access points for both BSS1 (101) and BSS3 (103). A station in overlap area 123 that uses channel 1 might see the access points for both BSS2 (102) and BSS3 (103). A station in overlap area 153 that uses channel 1 might see the access points for any of BSS1 (101), BSS2 (102) and BSS3 (103). On the other hand, there would not be any station in overlap area 124 that would see the access points for both BSS2 (102) and BSS4 (104), because there is no channel overlap.

According to one implementation, each access point may use two or more channels, with a first channel used for stations that are nearby, and a second channel used for stations that are more distant. The nearby stations can be allocated a wider bandwidth on the first channel, while the distant stations are allocated a narrower bandwidth on the second channel.

Figure 2:
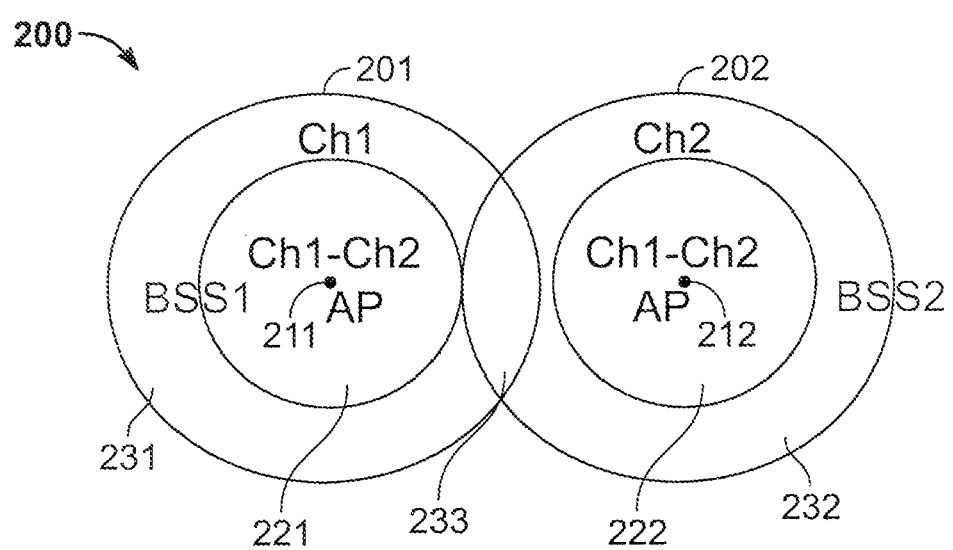
FIG. 2 shows an arrangement of two BSSs according to one implementation.

FIG. 2 shows an arrangement 200 of two neighboring BSS1 (201) and BSS2 (202). The access points in BSS1 (201) and BSS2 (202) both use two channels identified as Ch1 and Ch2. The access point 211 in BSS1 (201) may use Ch1 as the wider bandwidth channel for nearby stations in central area 221, while the access point 212 in BSS2 (202) may use Ch2 as the wider bandwidth channel for nearby stations in central area 222. Conversely, access point 211 in BSS1 (201) may use Ch1 as the narrower bandwidth channel for distant stations in peripheral area 231, while BSS2 (202) may use Ch2 as the narrower bandwidth channel for distant stations in peripheral area 232. In peripheral overlap area 233, there would be no collisions or interference between distant stations associated with BSS1 (201) and distant, stations associated with BSS2 (202), because distant stations associated with BSS1 (201) would be using Ch1 and distant stations associated with BSS2 (202) would be using Ch2.

In such an implementation, each access point can transmit channel parameters to all stations in that access point's respective BSS. A new management frame or beacon frame can be provided for this transmission. If the access point transmits the wider-bandwidth parameter using lower transmit power, wider transmission bandwidth, and/or higher MCS or data rate, while transmitting the narrower-bandwidth parameter using higher transmit power, narrower transmission bandwidth, and/or lower MCS or data rate, then stations that are closer to the access point will receive both the wider- and narrower-bandwidth parameters while stations that are farther from the access point will receive only the narrower-bandwidth parameters. Each station can be configured to use the wider-bandwidth channel if the station receives both bandwidth parameters, and otherwise to use the channel corresponding to the bandwidth parameter that the station receives (i.e., the narrower-bandwidth channel). In this way, each station will automatically receive bandwidth parameters for, and will use, the channel bandwidth that that station should be using.

According to another implementation, each access point may use two or more channels. Both channels are allocated the same bandwidth, but each access point defines a different transmit power level for different transmit opportunity (TROP) bandwidths. A wider-bandwidth TXOP uses a lower transmit power threshold, while a narrower-bandwidth TXOP uses a higher transmit power threshold. When a station cannot reach the access point using a wider-bandwidth TXOP at lower transmit power, it uses a narrower-bandwidth TXOP at higher transmit power. A new management frame or beacon frame can be provided for announcing the power levels for the different bandwidth TXOPs.

Looking again at FIG. 2, the access points in BSS1 (201) and BSS2 (202) both use two channels identified as Ch1 and Ch2. Access point 211 in BSS1 (201) may use Ch1 as the wider TXOP bandwidth channel, while the access point 212 in BSS2 (202) may use Ch2 as the wider TXOP bandwidth channel. In general, but not necessarily, nearby stations in central area 221 (for BSS 201) or central area 222 (for BSS 202) would be the ones using the wider TXOP bandwidth channel. Conversely, access point 211 in BSS1 (201) may use Ch1 as the narrower TXOP bandwidth channel, while BSS2 (202) may use Ch2 as the narrower TXOP bandwidth channel. In general, but not necessarily, distant stations in peripheral area 231 (for BSS1 201), and distant stations in peripheral area 232 (for BSS2 202). In peripheral overlap area 233, there would be no collisions or interference between narrower TXOP bandwidth stations associated with BSS1 (201) and narrower TXOP bandwidth stations associated with BSS2 (202), because narrower TXOP bandwidth stations associated with BSS1 (201) would be using Ch1 and narrower TXOP bandwidth stations associated with BSS2 (202) would be using Ch2.

According to such an implementation, each individual station would be configured to first try to communicate with the respective access point using the wider TXOP bandwidth channel at low power. If the communication were successful, that station would continue to use the wider TXOP bandwidth channel at low power. If the communication were unsuccessful, that station would switch to, and continue to use, the narrower TXOP bandwidth channel. In this way, each station will automatically select its TXOP bandwidth and power level parameters.

Static Clear Channel Assessment (CCA) may be used to allow a device to decide whether the wireless medium is busy or idle—e.g., −82 dbm at 20 MHz, −79 dbm at 40 MHz and −76 dbm at 80 MHz, etc. This may make spatial reuse difficult. Instead of static CCA, dynamic CCA may be used when a device needs to decide whether the wireless medium is busy or idle—e.g., −70 dbm or lower at 20 MHz, with CCA levels for 40 MHz, 80 MHz, etc., increased accordingly. This higher dynamic CCA level can allow a BSS to transmit even when a neighboring BSS already is busy. However, a device that detects the higher energy level may use lower MCS to deal with the higher interference, and the lower MCS may decrease the BSS throughput.

To address this, according to some implementations of this disclosure, an access point can define different TXOP limits for same access category for different CCA levels. This can present a better chance for a low-interference station or access point to transmit. When a higher CCA level is detected at a time that the backoff counter is equal to '0', or a higher CCA level is used to count down the backoff counter, a smaller TXOP limit can be used. When a lower CCA level is detected at a time that the backoff counter is equal to '0', or a lower CCA level is used to count down the backoff counter, a larger TXOP limit can be used.

According to other implementations, this can be addressed by having the access point define different TXOP limits for same access category according to which data rate (e.g., as represented by MCS) is selected. This can give more time for a low-interference station or access point to transmit. For example, when a higher-rate MCS is selected for a transmit opportunity, a larger TXOP limit may be used. Conversely, when a lower-rate MCS is selected for a transmit opportunity, a smaller TXOP limit may be used.

A particular BSS is usually part of a larger network including other BSSs served by other access points. The discussions above of the various implementations in connection with FIG. 2 set forth that neighboring BSSs used different channels, or channels with different parameters, in overlap areas. Each access point may plan its access parameters based on constraints and needs within its own BSS as well as neighboring BSSs. As noted above, each access point may reserves higher power or narrower bandwidth for use in communicating with "edge" stations (those that have poor signal characteristics whether or not they are physical remote from the access point). The access points can try to coordinate so that when one access point sets higher-power or narrower-bandwidth parameters, its neighbors set lower-power or wider-bandwidth parameters.

Coordination among access points may start with each access point that wants to begin transmitting listening to its neighboring access point(s). The later-starting access point can listen to the broadcast parameter announcement(s) of other access points and decides its own parameter pattern accordingly. Such "listening" can be assisted by station reports, where each access point can require its stations to report when they hear any parameter announcements from neighboring access points (most likely it would be spatially remote stations that would hear such announcements by neighboring access points). Alternatively, or additionally, stations can report the received neighboring power window information either periodically, or at association/re-association. The access points also can regularly poll its stations to see if they have heard any such announcements. As a further alternative, where the access points are part of a managed network, coordination among access points can be managed via backhaul communications with a management entity.

The parameter announcements by different access points can occur synchronously. One system for joint transmission by multiple access points, that may be used for synchronous announcements, is described in copending, commonly-assigned U.S. Provisional Patent Application No. 62/054,692, filed Mar. 6, 2014, and U.S. patent application Ser. No. 14/639,477, filed Mar. 5, 2015, each of which is hereby incorporated by reference in its respective entirety. Other timing approaches are possible. In a first "semi-synchronous" approach, each access point can send its parameter announcement after the Short Interframe Space following the parameter announcement of a neighboring access point. In a second semi-synchronous approach, the parameter announcements can be sent at pre-negotiated times. Or the parameter window announcements can be sent completely asynchronously, without special priority.

Figure 3:
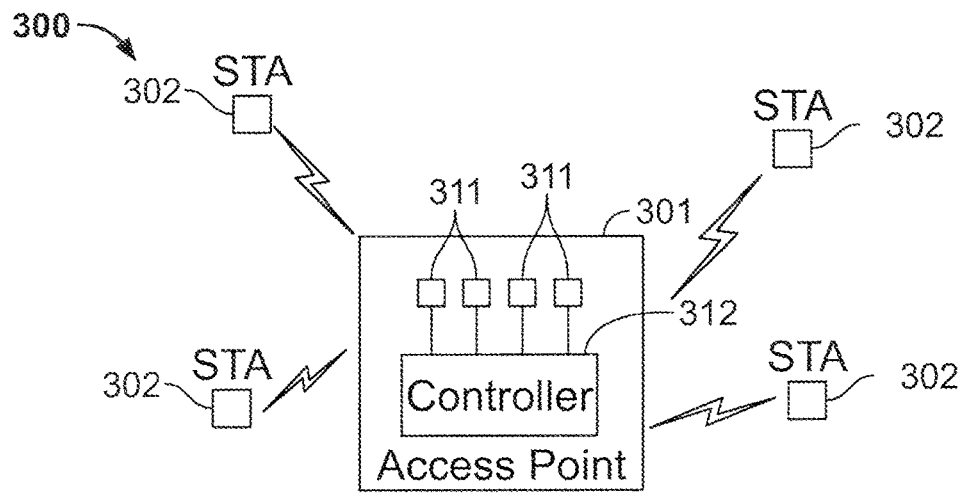
FIG. 3 shows a block diagram of an exemplary system according to an implementation of this disclosure.
Figure 4:
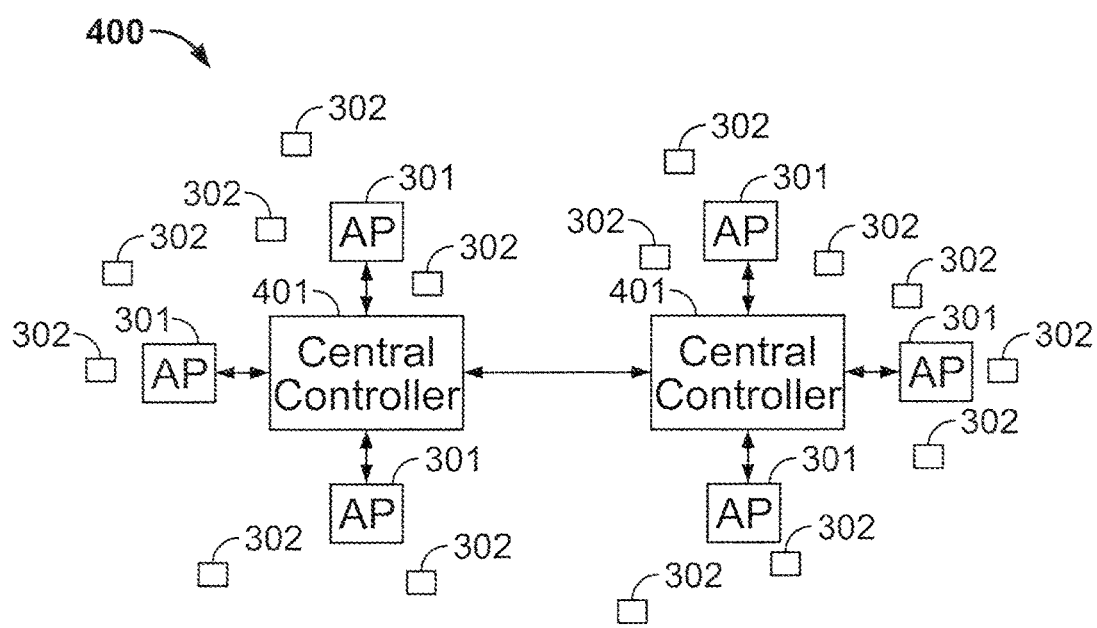
FIG. 4 shows a block diagram of another exemplary system according to an implementation of this disclosure.

FIG. 3 shows a block diagram of an exemplary system 300 including stations 302 and an exemplary access point 301, having a plurality of transceivers 311 for operating a plurality of channels and subchannels, and a controller 312 which, among other things, selects the power scheme and channelization/subchannelization schemes. A plurality of access points 301 may be part of a larger system 400 controlled by one or more central controllers 401 as shown in FIG. 4.

Figure 5:
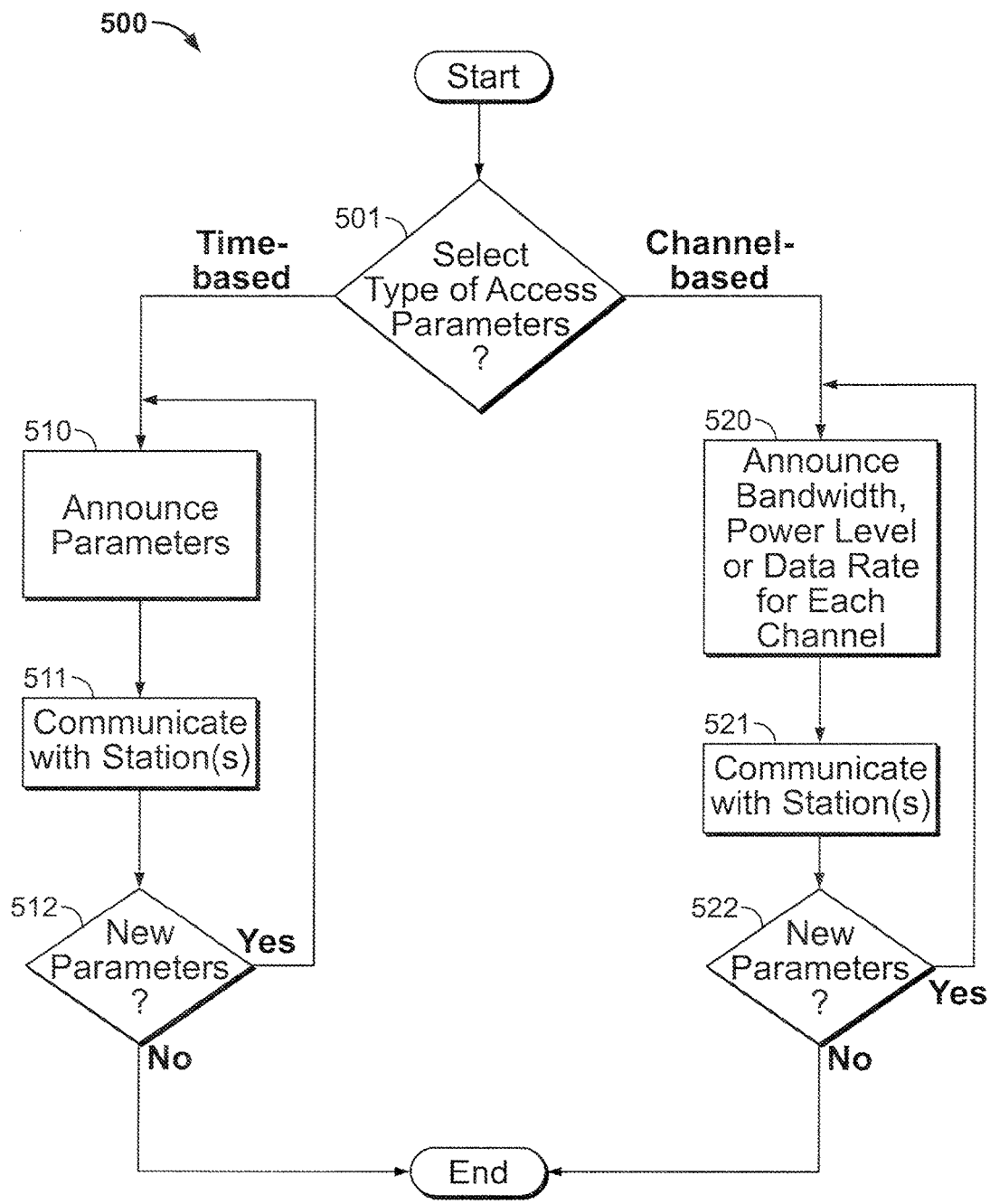
FIG. 5 is a flow diagram of a basic method according to implementations of this disclosure for operation of an access point.

A basic exemplary method 500 according to implementations of this disclosure for operation of an access point is diagrammed in FIG. 5.

At 501, it is decided (by the access point or a central controller, e.g. based on user input) whether the access parameters will be time-based (e.g., EDCA parameters, a contention window parameters, arbitration interframe spacing parameters, or a TROP limit parameters) or channel-based (e.g., channel bandwidth parameter, transmit power parameter, or data rate).

If the access parameters are time-based, then at 510, the access point announces a time-based parameter. The parameter could be set, as described above, by the access point itself based on inspection of parameters of neighbor access points, based on consultation with neighbor access points, or under control of a central controller.

At 511, the access point communicates with stations during the time window. As noted above, the stations could automatically identify the parameters that are appropriate for it. After the communication, at 512 it is determined whether additional parameters are to be set. If so, the new parameters are announced at 510. If at 512 no new parameters are to be set, then method 500 ends.

If at 501 the access parameters are channel based, then at 520, a bandwidth, power level or data rate parameter is established for each channel by the access point. The parameter could be set, as described above, by the access point itself based on inspection of neighbor access points, based on consultation with neighbor access points, or under control of a central controller.

At 521, the access point communicates with stations on the various channels. As noted above, each station could automatically identify the parameters that are appropriate for it. After there are no more communications, at 522 it is determined whether additional parameters are to be set. If so, the new parameters are announced at 520. If at 522 no new parameters are to be set, then method 500 ends.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A wireless communication system comprising:
a first wireless access point; and
a first set of at least one first station in wireless communication with the first wireless access point;
an additional wireless access point; and
an additional set of at least one additional station in wireless communication with the additional wireless access point,
wherein the first wireless access point controls access parameters for communications with a first station in the set of at least one first station;
wherein the additional wireless access point controls access parameters for communications with an additional station in the additional set of at least one additional station;
wherein the first wireless access point sets a first transmit power threshold for stations with a first transmit opportunity bandwidth access parameter when the additional wireless access point sets a second transmit power threshold for stations with a second transmit opportunity bandwidth access parameter; and wherein the first wireless access point sets the second transmit power threshold for stations with the first transmit opportunity bandwidth access parameter when the additional wireless access point sets the first transmit power threshold for stations with the second transmit opportunity bandwidth access parameter.

2. The wireless communication system of claim 1, wherein the first wireless access point controls access parameters for communications with a group or groups of first stations within the first set of at least one first station.

3. The wireless communication system of claim 1, wherein the access parameters include Enhanced Distributed Channel Access parameters.

4. The wireless communication system of claim 3, wherein the Enhanced Distributed Channel Access parameters include one or more of a minimum contention window parameter, a maximum contention window parameter, an arbitration interframe spacing parameter, or a transmit opportunity limit parameter.

5. The wireless communication system of claim 4 wherein:
the Enhanced Distributed Channel Access parameters include a transmit opportunity limit parameter, and
the transmit opportunity limit parameter is selected based on at least one of interference level, clear channel access level, or data rate.

6. The wireless communication system of claim 1, wherein the access parameters include one or more of a channel bandwidth parameter, a transmit power parameter, or a data rate parameter.

7. The wireless communication system of claim 6, wherein the data rate parameter includes a modulation and coding scheme parameter.

8. The wireless communication system of claim 6, wherein the access parameters include a channel bandwidth parameter.

9. The wireless communication system of claim 6, wherein the access parameters include a transmit opportunity bandwidth parameter.

10. The wireless communication system of claim 1, wherein the first wireless access point and the additional wireless access point control access parameters to avoid interference between the first wireless access point and the additional wireless access point.

11. The wireless communication system of claim 1, wherein:
the first wireless access point sets a channel access parameter for distant stations to a first channel when the additional wireless access point sets the channel access parameter for distant stations to a second channel; and
the first wireless access point sets the channel access parameter for distant stations to the second channel when the additional wireless access point sets the channel access parameter for distant stations to the first channel.

12. The wireless communication system of claim 1, further comprising
a central controller that coordinates between the first wireless access point and the additional wireless access point so that the first wireless access point and the additional wireless access point set access parameters to avoid interference between the first wireless access point and the additional wireless access point.

13. A method of operating a wireless communication system having a first wireless access point, and a first set of at least one first station in wireless communication with the first wireless access point, the method comprising:
controlling access parameters at the first wireless access point for communications with a first station in the set of at least one first station; and
controlling access parameters at an additional wireless access point for communications with an additional station in an additional set of at least one additional station, wherein:
the controlling access parameters at the first wireless access point comprises setting a first transmit power threshold for stations with a first transmit opportunity bandwidth access parameter when the additional wireless access point sets a second transmit power threshold for stations with a second transmit opportunity bandwidth access parameter; and
the controlling access parameters at the first wireless access point comprises setting the second transmit power threshold for stations with the first transmit opportunity bandwidth access parameter when the additional wireless access point sets the first transmit power threshold for stations with the second transmit opportunity bandwidth access parameter.

14. The method of claim 13, wherein the controlling comprises controlling access parameters at the first wireless access point for communications with a group or groups of first stations within the first set of at least one first station.

15. The method of claim 13, wherein the access parameters include Enhanced Distributed Channel Access parameters.

16. The method of claim 15, wherein the Enhanced Distributed Channel Access parameters include one or more of a minimum contention window parameter, a maximum contention window parameter, an arbitration interframe spacing parameter, or a transmit opportunity limit parameter.

17. The method of claim 16, wherein:
the Enhanced Distributed Channel Access parameters include a transmit opportunity limit parameter, and
the transmit opportunity limit parameter is selected based on at least one of interference level, clear channel access level, or data rate.

18. The method of claim 13, wherein the access parameters include one or more of a channel bandwidth parameter, a transmit power parameter, or a data rate parameter.

19. The method of claim 18, wherein the data rate parameter includes a modulation and coding scheme parameter.

20. The method of claim 18, wherein the access parameters include a channel bandwidth parameter.

21. The method of claim 18 wherein the access parameters include a transmit opportunity bandwidth parameter.

22. The method of claim 13
wherein the controlling access parameters at the first wireless access point and the controlling access parameters at the additional wireless access point are performed to avoid interference between the first wireless access point and the additional wireless access point.

23. The method of claim 13 wherein:
the controlling access parameters at the first wireless access point comprises setting a channel access parameter for distant stations to a first channel when the additional wireless access point sets the channel access parameter for distant stations to a second channel; and
the controlling access parameters at the first wireless access point comprises setting the channel access parameter for distant stations to the second channel when the additional wireless access point sets the channel access parameter for distant stations to the first channel.

24. The method of claim 13 further comprising:

coordinating between the first wireless access point and the additional wireless access point so that the first wireless access point and the additional wireless access point set power levels to avoid interference between the first wireless access point and the additional wireless access point.

* * * * *